United States Patent
Hatakeyama (10) Patent No.: US 9,865,229 B2
(45) Date of Patent: Jan. 9, 2018

(54) IMAGE DISPLAY DEVICE AND IMAGE DISPLAY METHOD

(71) Applicant: Panasonic Intellectual Property Management Co., Ltd., Osaka (JP)

(72) Inventor: Takeshi Hatakeyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 29 days.

(21) Appl. No.: 15/045,332

(22) Filed: Feb. 17, 2016

(65) Prior Publication Data

US 2016/0260415 A1   Sep. 8, 2016

(30) Foreign Application Priority Data

Mar. 3, 2015 (JP) .................................. 2015-041246

(51) Int. Cl.
| | |
|---|---|
| G09G 5/00 | (2006.01) |
| G09G 5/12 | (2006.01) |
| G09G 5/10 | (2006.01) |
| G06F 3/0489 | (2013.01) |
| G06F 9/44 | (2006.01) |

(52) U.S. Cl.
CPC .............. *G09G 5/12* (2013.01); *G09G 5/00* (2013.01); *G09G 5/003* (2013.01); *G09G 5/10* (2013.01); *G06F 3/04895* (2013.01); *G06F 9/4446* (2013.01); *G09G 2320/062* (2013.01); *G09G 2320/0626* (2013.01); *G09G 2320/0666* (2013.01); *G09G 2354/00* (2013.01)

(58) Field of Classification Search
None
See application file for complete search history.

(56) References Cited

U.S. PATENT DOCUMENTS

| | | |
|---|---|---|
| 6,611,297 B1 | 8/2003 | Akashi et al. |
| 2004/0189630 A1 | 9/2004 | Huh et al. |

(Continued)

FOREIGN PATENT DOCUMENTS

| | | |
|---|---|---|
| JP | 3-239067 | 10/1991 |
| JP | 5-224684 | 9/1993 |

(Continued)

*Primary Examiner* — Joseph Haley
(74) *Attorney, Agent, or Firm* — McDermott Will & Emery LLP (57) ABSTRACT

An image display device comprises: a memory capable of storing source data that are sources of a plurality of screen images; a display capable of displaying at least one screen image selected from among the plurality of screen images; an illumination source disposed around the display and capable of emitting light of a specified emission color; and a controller. The controller produces a current screen image data from the source data, and produces a current screen image based on the current screen image data to display the current screen image. The controller also produces a selective screen image data for producing a selective screen image which is different from the current screen image from the source data, produces an illumination data based on the selective screen image data, and controls the illumination source to emit light of an emission color determined based on the illumination data.

13 Claims, 7 Drawing Sheets

| Application | Emission colors |
|---|---|
| Browser | White |
| Spread sheet | Green |
| Word processing | Blue |
| Drawing | Red |

(56) References Cited

U.S. PATENT DOCUMENTS

| | | |
|---|---|---|
| 2007/0097245 A1* | 5/2007 | Battles ............... G06F 3/03547 |
| | | 348/333.01 |
| 2008/0211828 A1 | 9/2008 | Huh et al. |
| 2008/0297591 A1 | 12/2008 | Aarts et al. |
| 2009/0256962 A1 | 10/2009 | Iwanami et al. |
| 2010/0020251 A1 | 1/2010 | Kadijk et al. |
| 2010/0026734 A1 | 2/2010 | Kwisthout et al. |
| 2010/0321284 A1 | 12/2010 | Kwisthout |
| 2012/0019165 A1 | 1/2012 | Igaki et al. |
| 2012/0113131 A1 | 5/2012 | Peters |
| 2012/0154427 A1 | 6/2012 | Sugiyama |

FOREIGN PATENT DOCUMENTS

| | | |
|---|---|---|
| JP | 2004-212969 | 7/2004 |
| JP | 2006-156416 | 6/2006 |
| JP | 2010-512677 | 4/2010 |
| JP | 2012-069503 | 4/2012 |
| JP | 2012-128209 | 7/2012 |
| WO | 2005/062608 | 7/2005 |
| WO | 2007/122987 | 11/2007 |
| WO | 2008/050281 | 5/2008 |
| WO | 2008/078233 | 7/2008 |
| WO | 2011/004289 | 1/2011 |

\* cited by examiner

| Data analysis result for display of map screen image | Emission colors |
|---|---|
| Forest | Green |
| Mountain | Brown |
| Sea | Blue |

| Coordinate | A | B | C |
|---|---|---|---|
| 1 | Spread sheet | - | - |
| 2 | Browser | Drawing | - |
| 3 | Word processing | - | - |
| 4 | - | - | - |

FIG. 9

| Application | Emission colors |
|---|---|
| Browser | White |
| Spread sheet | Green |
| Word processing | Blue |
| Drawing | Red |

IMAGE DISPLAY DEVICE AND IMAGE DISPLAY METHOD

BACKGROUND

1. Technical Field

The present disclosure relates to an image display device with an illumination source.

2. Description of Related Art

PTL 1 discloses an image display device with an illumination source that is capable of operating the illumination source to emit light in association with an image being displayed. This image display device makes it possible to enhance dramatic impact with a displayed image and associated illumination.

CITATION LIST

Patent Literature

PTL 1: Japanese Translation of PCT Publication No. 2010-512677

SUMMARY

The present disclosure is to provide an image display device with an illumination source that is effective to select one of a plurality of screen images by a manual operation.

An image display device in accordance with the present disclosure comprises: a memory capable of storing source data that are sources of a plurality of screen images; a display capable of displaying at least one screen image selected from among the plurality of screen images; an illumination source disposed around the display and capable of emitting light of a specified emission color; and a controller that controls display on the display and light emission of the illumination source. The controller produces a current screen image data from the source data, and produces a current screen image based on the current screen image data to display the current screen image on the display. The controller also produces from the source data a selective screen image data for producing a selective screen image which is different from the current screen image, produces an illumination data based on the selective screen image data, and controls the illumination source to emit light of an emission color determined based on the illumination data.

Another image display device in accordance with the present disclosure comprises: a memory capable of storing source data that are sources of a plurality of screen images and emission colors corresponding to the plurality of screen images; a display capable of displaying at least one screen image selected from among the plurality of screen images; an illumination source disposed around the display and capable of emitting light of a specified emission color; and a controller that controls display on the display and light emission of the illumination source. The controller produces a current screen image data from the source data, produces a current screen image based on the current screen image data to display the current screen image on the display. The controller also controls the illumination source to emit light of an emission color corresponding to a selective screen image which is different from the current screen image.

An image display method in accordance with the present disclosure is an image display method for displaying an image on a display with an illumination source disposed around the display, and comprises: producing a current screen image data from source data which are sources of a plurality of screen images; producing a current screen image based on the current screen image data to display the current screen image on the display; producing from the source data a selective screen image data for producing a selective screen image which is different from the current screen image; producing an illumination data based on the selective screen image data; and controlling the illumination source to emit light of an emission color determined based on the illumination data.

An image display device in accordance with the present disclosure is effective to select one screen image from a plurality of screen images by a manual operation.

DETAILED DESCRIPTION OF THE PREFERRED EMBODIMENT

Hereinafter, an exemplary embodiment will be described with reference to the accompanying drawings as appropriate. However, unnecessarily detailed description may occasionally be omitted. For example, detailed description of well-known matters and redundant description of substantially the same configuration may occasionally be omitted. This is to avoid the following description from becoming unnecessarily redundant, and to allow any person skilled in the art to easily understand the description.

Also, it should be noted that the following description and the accompanying drawings are provided to allow any person skilled in the art to fully understand the present disclosure, and that it is not intended to limit the subject matter described in the claims by the following description.

Also, like reference marks, symbols and numerals in the description will be used to refer to like components unless otherwise specifically mentioned. Also, components which are not essential to the present disclosure will not be shown in the drawings unless otherwise specifically mentioned.

Exemplary Embodiment

Figure 1:
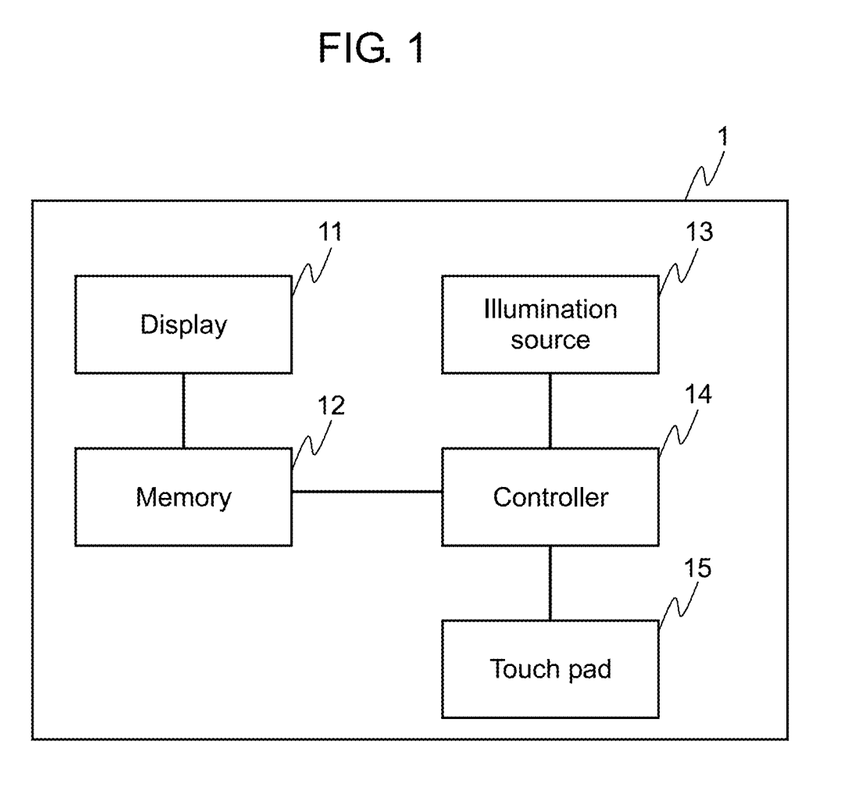
FIG. 1 is a block diagram illustrating an electrical configuration of an image display device in accordance with an exemplary embodiment.

Hereinafter, an exemplary embodiment will be described with reference to FIGS. 1 to 9. FIG. 1 is a block diagram illustrating an electrical configuration of image display device 1 in accordance with an exemplary embodiment. Image display device 1 comprises display 11, memory 12, illumination source 13, touch pad 15, and controller 14. Memory 12 is capable of storing a plurality of data (source data) which are sources of a plurality of images (screen images) to be displayed on display 11. Display 11 displays the screen image. Illumination source 13 is disposed to surround display 11. Touch pad 15 is capable of accepting an operation input by a user. Touch pad 15 is particularly capable of accepting an input regarding a direction. Controller 14 controls emission colors of illumination source 13 based on data stored in memory 12. Controller 14 also controls the screen images to be displayed by display 11 based on the input from touch pad 15.

Here, the term referred to as "screen image" is an image displayed on a screen of display 11 by controller 14. An example of the screen image is an image produced by controller 14 based on data stored in memory 12, such as an image drawn by controller 14 based on image data or an image of a map drawn by controller 14 based on map data. Further, a screen image of an application drawn by execution of the application by controller 14 is also an example of the screen image.

Figure 2:
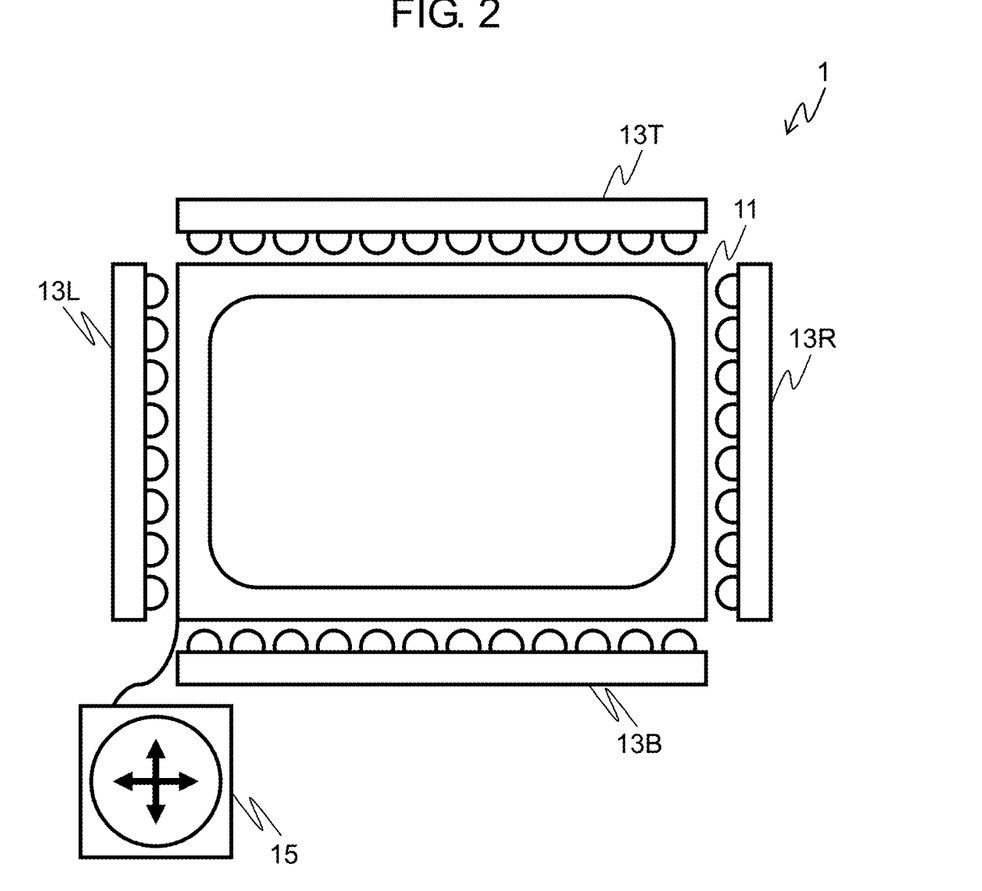
FIG. 2 is a diagram illustrating an arrangement of components configuring the image display device in accordance with the exemplary embodiment.

FIG. 2 is a diagram illustrating an arrangement of components configuring image display device 1 in accordance with the exemplary embodiment. Illumination source 13 includes top illumination source 13T, bottom illumination source 13B, left illumination source 13L, and right illumination source 13R. Top illumination source 13T, bottom illumination source 13B, left illumination source 13L, and right illumination source 13R are respectively disposed above, below, on the left, and on the right of display 11. Each of top illumination source 13T, bottom illumination source 13B, left illumination source 13L and right illumination source 13R is capable of emitting arbitrary color light independently of the others.

Also, touch pad 15 is provided for a user. Touch pad 14 is an example of an operation unit. Touch pad 14 provide the user with an input of up, down, left or right as a way of selecting a screen image. The user may operate touch pad 15 to input either one of the up, down, left and right. Controller 14 selects one of a plurality of data stored in memory 12 as a display data based on an input accepted by touch pad 15, produces a screen image based on the display data, and displays the screen image on display 11. For example, in a case where a screen image is displayed (a current screen image) and there exist screen images continuous from the current screen image in the up, down, left and right directions (selective screen images), controller 14 is capable of displaying any of the selective screen images located in the up, down, left and right directions with respect to the current screen image being currently displayed according to an input up, down, left or right direction accepted by touch pad 15. Here, the image referred to as the "current screen image" means an image which is currently being displayed on display 11. Each of the images referred to as the "selective screen images" means an image which can be selected by an input from an operation unit such as touch pad 15 or the like when the current screen image is being displayed, and can be transitioned from the current screen image.

Further, when a certain screen image is being displayed on display 11, controller 14 controls illumination source 13 to emit color light corresponding to a selective screen image, which can be displayed in exchange for the current screen image according to a direction input from touch pad 15. In other words, controller 14 selects a display data (a selective screen image data) that is different from the display data (the current screen image data) which is a source of the current screen image being currently displayed on the display 11 and that corresponds to an input direction which is acceptable by touch pad 15, and determines an illumination data based on the selective screen image data. Then, controller 14 controls illumination source 13 that corresponds to an input direction acceptable by touch pad 15 to emit light of an emission color determined based on the illumination data.

For example, controller 14 controls top illumination source 13T disposed above display 11 to emit light of an emission color corresponding to a selective screen image which is displayed in a case where the up direction is input by touch pad 15. Similarly, controller 14 controls bottom illumination source 13B to emit light of an emission color corresponding to a selective screen image which is displayed in a case where the down direction is input by touch pad 15, left illumination source 13L to emit light of an emission color corresponding to a selective screen image which is displayed in a case where the left direction is input by touch pad 15, and right illumination source 13R to emit light of an emission color corresponding to a selective screen image which is displayed in a case where the right direction is input by touch pad 15. In other words, controller 14 controls illumination source 13 corresponding to an input direction acceptable by touch pad 15 to emit light of an emission color that is determined based on a selective screen image data corresponding to a selective screen image displayed when the input direction is entered.

Operations of image display device 1 performing the above-described illumination control and screen image control will be described. Memory 12 has stored therein data for producing a plurality of screen images (source data) and data indicating relationships among the screen images. Controller 14 analyzes data stored in memory 12 to perform illumination control for illumination source 13. Also, controller 14 performs switching of screen images displayed by display 11 based on an input from touch pad 15.

A manner of controlling illumination source 13 will be described. Controller 14 determines an emission color of illumination source 13 based on a display data (a selective screen image data) of a selective screen image to be transitioned from the current screen image when corresponding one of the up, down, left and right of touch pad 15 is selected, and controls illumination source 13 to emit light of the determined emission color. Method of determining the emission color by controller 14 may be a determination method by analyzing the selective screen image data or a determination method using an emission color which has been predetermined to correspond to the selective screen image data.

Figure 3:
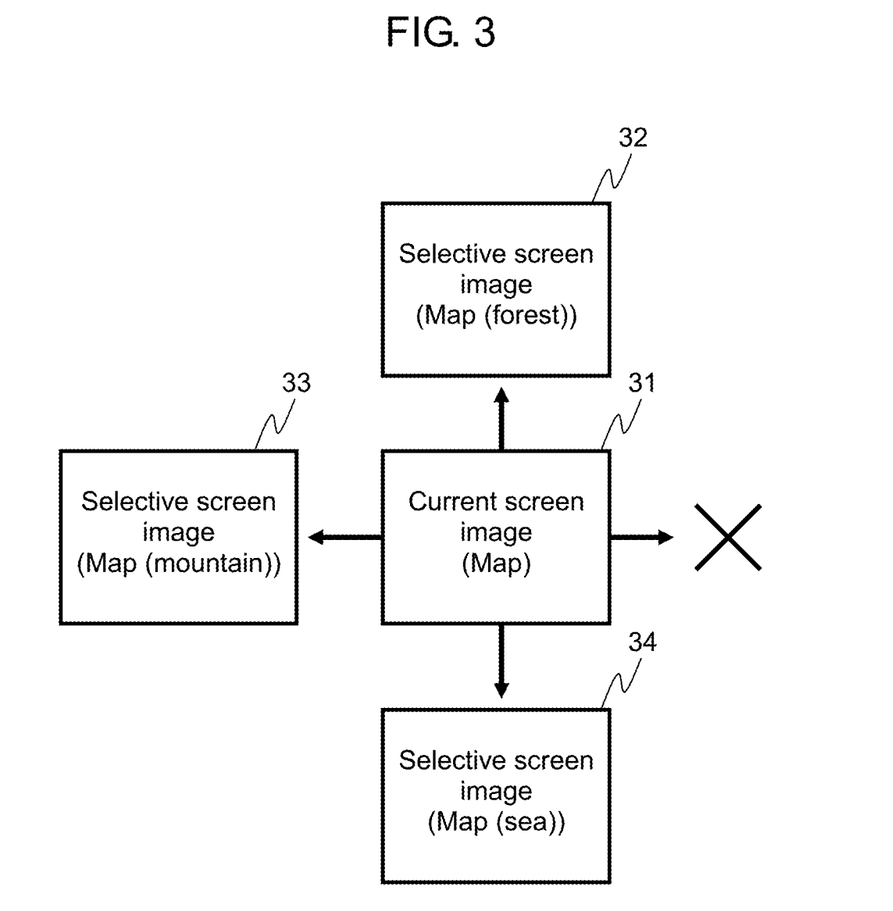
FIG. 3 is a diagram illustrating a screen image transition flow in a first control example of the image display device in accordance with the exemplary embodiment.
Figure 4:
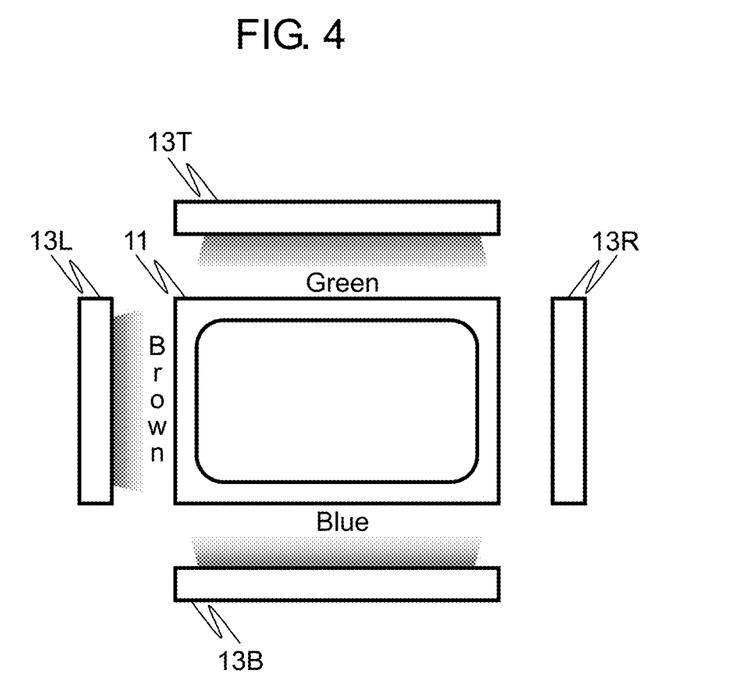
FIG. 4 is a diagram illustrating a specific example of light emission in the first control example of the image display device in accordance with the exemplary embodiment.

Next, examples of controlling the screen image and the illumination source will be described more specifically. FIG. 3 and FIG. 4 are diagrams illustrating a first control example of image display device 1 in accordance with the present exemplary embodiment. FIG. 3 is a diagram illustrating a screen image transition flow in the first control example. FIG. 4 is a diagram illustrating a specific example of light emission from illumination source 13 in the first control example. In the first control example, display 11 is displaying a map image as current screen image 31. Available map images located in the up, down, left and right directions from the map image currently being displayed will be displayed by respectively selecting the up, down, left and right of touch pad 15. FIG. 3 shows that selective screen image 32 which is a map (forest) having many forest areas, selective screen image 33 which is a map (mountain) having many mountain areas and selective screen image 34 which is a map (sea) having many sea areas exist respectively in the up, left and down directions from current fame image 31. Also, there exists no available image, or no selective screen image, in the right direction from current screen image 31.

FIG. 4 shows an example that illumination source 13 emits color light corresponding to screen images to be displayed respectively according to selections of the up, down, left and right of touch pad 15. Because selective screen image 32 existing in the up direction from current screen image 31 is a map having many forest areas, top illumination source 13T emits green color light when current screen image 31 is being displayed on display 11. Because selective screen image 33 existing in the left direction from current screen image 31 is a map having many mountain areas, left illumination source 13L emits brown color light when current screen image 31 is being displayed on display 11. Because selective screen image 34 existing in the down direction from current screen image 31 is a map having many sea areas, bottom illumination source 13B emits blue color light when current screen image 31 is being displayed on display 11. On the other hand, because no available screen image, or no selective screen image, exists in the right direction from current screen image 31, right illumination source 13R emits no light when current screen image 31 is being displayed on display 11.

Figure 5:
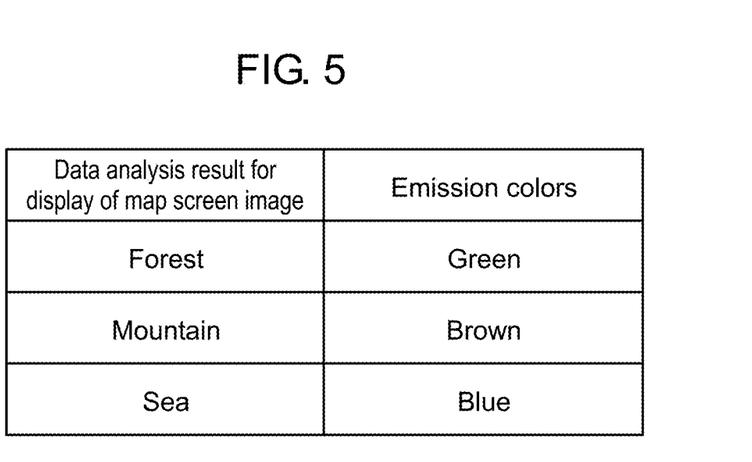
FIG. 5 is a diagram illustrating a table for determining a correspondence between geographical features and emission colors.

The above-described control can be realized by the operation of controller 14 as will be described in the following. Memory 12 has stored therein map data. Plural map data stored in memory 12 are source data for constructing map screen images adjacent to one another. Memory 12 also has stored therein a table indicating a correspondence between the geographical features in the maps and emission colors of illumination source 13. FIG. 5 is a diagram illustrating a table for determining a correspondence between map screen image display data and emission colors.

Controller 14 produces a map screen image by reading out display data for a map to be displayed, and displays the produced map screen image as current screen image 31 on display 11. Based on a direction input accepted by touch pad 15, controller 14 reads out a display data of a map screen image adjacent to the map screen image currently being displayed on display 11 as a reference in a direction specified by touch pad 15, produces a map screen image, and displays the produced map screen image on display 11.

Controller 14 also reads out and analyzes the display data for the map screen image adjacent to current screen image 31, and determines a representative geographical feature in the map. Then, controller 14 refers to the table shown in FIG. 5 based on the determined geographical feature, and determines an emission color of illumination source 13.

For example, in a case where controller 14 determines that display data corresponding to selective screen image 32 located in the up direction from current screen image 31 has a relatively high rate of data indicating forest, controller 14 determines the emission color of top illumination source 13T disposed above display 11 as green corresponding to forest, and controls top illumination source 13T to emit green color light. Similarly, in a case where controller 14 determines that display data corresponding to selective screen image 33 located in the left direction from current screen image 31 has a relatively high rate of data indicating mountain, controller 14 determines the emission color of left illumination source 13L disposed on the left of display 11 as brown corresponding to mountain, and controls left illumination source 13L to emit brown color light. In a case where controller 14 determines that display data corresponding to selective screen image 34 located in the down direction from current screen image 31 has a relatively high rate of data indicating sea, controller 14 determines the emission color of bottom illumination source 13B disposed below display 11 as blue corresponding to sea, and controls bottom illumination source 13B to emit blue color light.

On the other hand, in a case where controller 14 determines that there are no display data corresponding to a selective screen image located in the right direction from current screen image 31, controller 14 controls illumination source 13R disposed on the right of display 11 not to emit light. In other words, in a case where controller 14 determines that there are no display data in the source data for producing a selective screen image corresponding to a direction acceptable by touch pad 15, controller 14 controls illumination source 13 corresponding to the acceptable direction not to emit light.

According to the above-described control, a user can intuitively understand an outline of maps located in the up, down, left and right directions from the map screen image currently being displayed.

Figure 6:
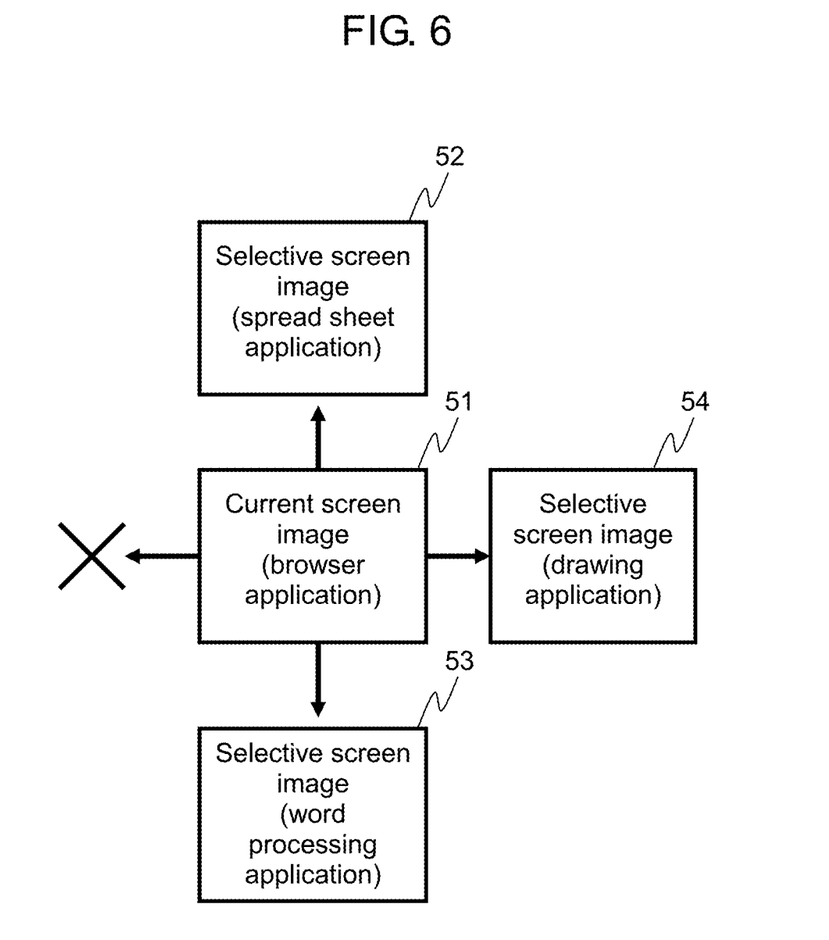
FIG. 6 is a diagram illustrating a screen image transition flow in a second control example of the image display device in accordance with the exemplary embodiment.
Figure 7:
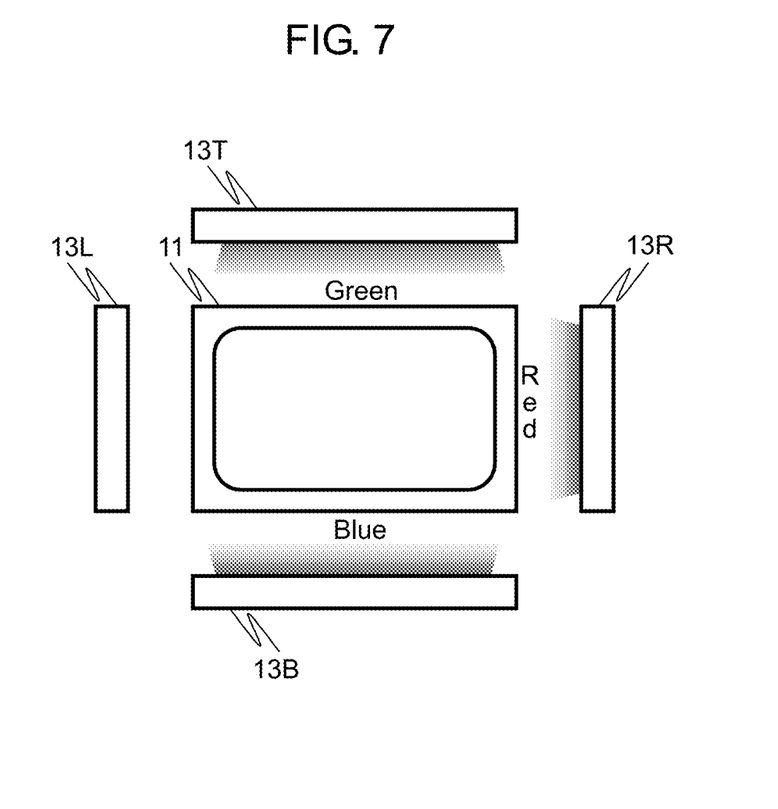
FIG. 7 is a diagram illustrating a specific example of light emission in the second control example of the image display device in accordance with the exemplary embodiment.

FIG. 6 and FIG. 7 are diagrams illustrating a second control example of image display device 1 in accordance with the present exemplary embodiment. FIG. 6 is a diagram illustrating a screen image transition flow under the second control example. FIG. 7 is a diagram illustrating a specific example of light emission from illumination source 13 in the second control example. The objects to be displayed in the second control example are screen images produced by applications executed in a personal computer or a tablet terminal. Current screen image 51 currently being displayed on display 11 is a browser application screen image. Selecting one of the up, down, left and right of touch pad 15 causes a corresponding application to be selected and displayed on display 11. More specifically, selections of the up, down and right of touch pad 15 respectively cause a spread sheet application, a word processing application and a drawing application to be selected and also cause respective selective screen images 52, 53 and 54 to be displayed. In a case where the left of touch pad 15 is selected, transition of application will not be performed, because there is no corresponding application.

FIG. 7 shows an example that each illumination source 13 emits light of an emission color corresponding to an application to be displayed in response to selecting a corresponding one of the up, down, left and right of touch pad 15. Since selecting the up of touch panel 15 causes the spread sheet application to be selected and causes screen image 52 of the spread sheet application to be displayed, top illumination source 13T emits green color light when current screen image 51 of the browser application is being displayed. Similarly, since selecting the down of touch panel 15 causes the word processing application to be selected and causes selective screen image 53 of the word processing application to be displayed, bottom illumination source 13B emits blue color light when current screen image 51 of the browser application is being displayed. Also, since selecting the right of touch panel 15 causes the drawing application to be selected and causes selective screen image 54 of the drawing application to be displayed, right illumination source 13R emits red color light when current screen image 51 of the browser application is being displayed.

On the other hand, since selecting the left of touch panel 15 does not cause transition of any application, left illumination source 13L does not emit light when current screen image 51 of the browser application is being displayed.

Figure 8:
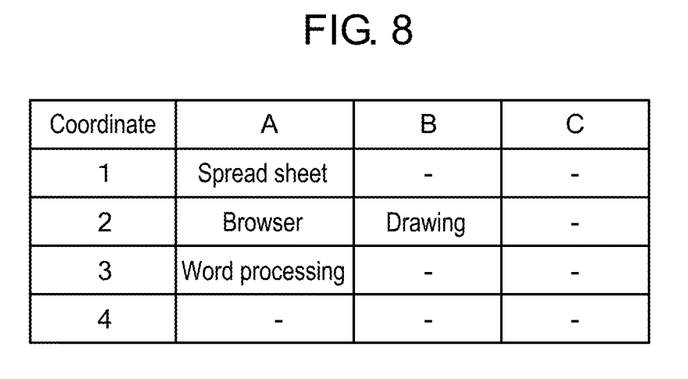
FIG. 8 is a diagram illustrating an arrangement of coordinates of a plurality of applications.
Figure 9:
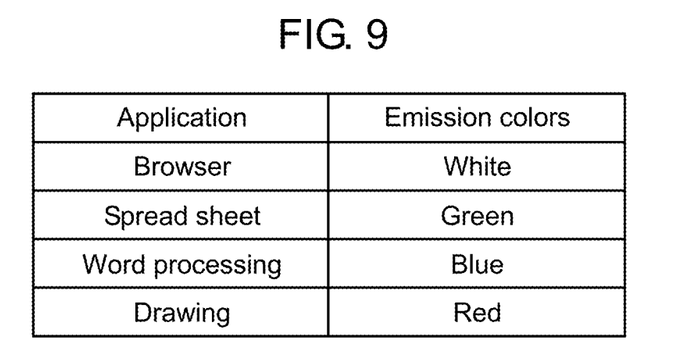
FIG. 9 is a diagram illustrating a table for corresponding emitting colors to the applications.

The above-described control can be realized by the operations of controller 14 as described in the following. Memory 12 has stored therein a table indicating coordinates of a plurality of applications. Memory 12 has also stored therein a table indicating a correspondence between the applications and emission colors of illumination source 13. FIG. 8 illustrates coordinates of the plurality of applications. FIG. 9 illustrates a table indicating a correspondence between the applications and emission colors of illumination source 13. Controller 14 executes an application based on source data to produce a screen image of the application, and displays the screen image on display 11. In a case where the current application is the browser application, controller 14 executes the browser application to produce a browser application screen image as current screen image 51, and displays the browser application screen image on display 11.

Also, controller 14 refers to the table as shown in FIG. 8 to obtain the correspondence between operation directions of touch pad 15 and the applications when current screen image 51 is being displayed based on the respective coordinates of the applications. In the present exemplary embodiment, as shown in FIG. 6, when current screen image 51 is the browser application screen image, controller 14 refers to the table shown in FIG. 8 and obtains the spread sheet application, the word processing application and the drawing application as applications respectively corresponding to the up, down and right operation directions of touch pad 15. Also, controller 14 recognizes at this time that there is no application that corresponds to the left direction operation of pad 15.

Also, controller refers to the table shown in FIG. 9 to obtain emission colors corresponding to the respective applications. In the present exemplary embodiment, as shown in FIG. 9, white, green, blue and red are set as emission colors corresponding to the browser application, the spread sheet application, the word processing application and the drawing application, respectively. Controller 14 refers to the tables shown in FIGS. 8 and 9, determines the correspondences between operation directions of touch pad 15 and emission colors, and controls illumination source 13 corresponding to each operation direction to emit light of an obtained corresponding emission color. Further, in a case where touch pad 15 is operated during when current screen image 51 is being displayed, controller 14 displays a corresponding application screen image on display 11 based on the correspondence relationship between the obtained operation direction of touch pad 15 and the application.

For example, when current screen image 51 is the browser application screen image as shown in FIG. 6, controller 14 obtains green as an emission color in response to an up operation of touch pad 15 with reference to the two tables shown in FIGS. 8 and 9. Then, controller 14 controls top illumination source 13T disposed above display 11 to emit green color light obtained with reference to the two tables. Similarly, controller 14 obtains blue as an emission color in response to a down operation of touch pad 15 with reference to the two tables. Then, controller 14 controls bottom illumination source 13B disposed below display 11 to emit blue color light obtained with reference to the two tables. Also, controller 14 obtains red as an emission color in response to a right operation of touch pad 15 with reference to the two tables. Then, controller 14 controls right illumination source 13R disposed on the right of display 11 to emit red color light obtained with reference to the two tables. On the other hand, controller 14 recognizes that no application is set corresponding to a left operation of touch pad 15 by referring to FIG. 8. Thus, controller 14 controls left illumination source 13L disposed on the left of display 11 not to emit light. In other words, in a case where controller 14 determines that there are no display data for producing a selective screen image corresponding to an accepted direction in the source data, controller 14 controls an illumination source 13 corresponding to the accepted direction of touch pad 15 not to emit light.

In each case where the applications corresponding to the operation directions of touch pad 15 vary according to the application screen image currently displayed on display 11, controller 14 may refer to the table shown in FIG. 8, update the correspondence between the operation directions and the applications, and then repeat the above-described operations.

By the illumination control as described above, the user can intuitively understand the applications that can be selected by the up, down, left and right operations. Accordingly, it is possible to provide an image display device 1 that allows the user to easily select a desired application.

As described above, according to the present exemplary embodiment, image display device 1 comprises: memory 12 that is capable of storing source data that are sources of a plurality of screen images; display 11 that is capable of displaying at least one screen image selected from among the plurality of screen images; illumination source 13 that is disposed around the display and is capable of emitting light of a specified color; and controller 14 that controls display of display 11 and light emission of illumination source 13. Controller 14 produces a current screen image data from the source data, and produces a current screen image based on the current screen image data to display the current screen image on display 11. Controller 14 also produces from the source data a selective screen image data for producing a selective screen image which is different from the current screen image, produces an illumination data based on the selective screen image data, and controls illumination source 13 to emit light of an emission color determined based on the illumination data.

This allows an illumination source 13 corresponding to an operation of touch pad 15 to emit light of an emission color corresponding to a screen image that may be transitioned from the current screen image in response to an operation of touch pad 15. Accordingly, it is possible to provide image display device 1 that can be easily operated by a user. In other words, image display device 1 in accordance with the present exemplary embodiment is effective to select one of a plurality of screen images by a manual operation.

Other Exemplary Embodiments

In the above description, an exemplary embodiment has been described as an example of techniques disclosed in the present application. However, the techniques according to the present disclosure are not limited to the above-described exemplary embodiment, and may be applied to other exemplary embodiments in which modifications, substitutions, additions, and/or omissions are made. Also, the structural components described in the above exemplary embodiment may be appropriately combined to configure a new exemplary embodiment. Such other exemplary embodiments will be described hereinafter.

1) In the above exemplary embodiment, such a configuration has been described that has touch pad 15 as an example of an operation unit. However, the operation unit may be any device as far as it can accept a direction input from a user. For example, the operation unit may be a touch panel or a joy stick.

2) In the above exemplary embodiment, such a configuration has been described that accepts an up, down, left or right direction input by touch pad 15 and selects a screen image according to the input direction. However, the directions for selecting a screen image may be other directions than the up, down, left and right directions. For example, in addition to the up, down, left and right directions, selection of a screen image may be performed according to a diagonal direction input of upper left, lower left, upper right or lower right. Also, in addition to the illumination control at the positions corresponding to the left, right, up and down directions, illumination control at positions corresponding to upper left, lower left, upper right and lower right directions may be performed. In this case, additional illumination sources respectively corresponding to the upper left, lower left, upper right and lower right directions may be provided in addition to top illumination source 13T, bottom illumination source 13B, left illumination source 13L and right illumination source 13R. As another method, illumination source 13 may be controlled so as to change an emission color at a part of the upper left, lower left, upper right or lower right. For example, in a case where the current screen image in the state shown in FIG. 6 has been changed from the browser application screen image to the drawing application screen image, the spread sheet application is located in the upper left direction of the current screen image, and the word processing application screen image is located in the lower left direction of the current screen image. In this case, controller 14 may refer to FIGS. 8 and 9, and control the illumination sources such that a left part of top illumination source 13T and an upper part of left illumination source 13L emit green color light and that a left part of bottom illumination source 13B and a lower part of left illumination source 13L emit blue color light.

3) In the above described exemplary embodiment, it has been described that each illumination source 13 emits light of a single color. However, each illumination source 13 may not necessarily emit light of a single color, but may emit light of multiple colors. For example, in the first control example, an illumination source may emit partly blue color light (sea) and partly brown color light (mountain) depending on a map screen image to be transitioned.

4) The present disclosure is effective in a case that a screen image selected by touch pad 15 is a moving picture. In such case, the color of the emitting light may be determined based on a particular one frame of image in the moving picture or may be determined based on plural frames of images.

5) The present disclosure is effective in a case that the color of the emitting light of the illumination source at each part is required to be varied with time. For example, in the case that a moving picture is selected as a selective screen image as described in paragraph 4) above, the illumination source may be controlled to emit light such that the emission color changes with time according to the moving image.

6) In the second control example in the above described exemplary embodiment, such a configuration has been described that stores emission colors corresponding to applications to be displayed as a table as shown in FIG. 9, and determines an emission color by referring to the table. However, the emission color may be determined by analyzing data regarding the corresponding application. Specifically, controller 14 may analyzes colors used in an icon corresponding to the application, and determines a color mainly used in the icon as an emission color. For example, if controller 14 analyzes an icon of the spread sheet application and determines that green color is mainly used in the icon, controller 14 may determines green color as the emission color corresponding to the spread sheet application.

7) The present disclosure is effective not only in a case that the entire screen image is replaced by another screen image in response to an operation by the operation unit, but also in a case that a part of the screen image is replaced by a part of another screen image. For example, the present disclosure is effective in such a case that the current screen image of a map moves dot by dot in response to each operation of the operation unit. In this case, the data stored in the memory are not separated on a frame by frame basis. Rather, entire image data are stored in the memory, and the current screen image data is produced from a part of the entire image data. Also, a selective screen image data for each of selective screen images to be displayed by operations of the operation unit is produced from a part of the entire image data, and the illumination data is produced based on the selective screen image data.

The present disclosure is applicable to an image display device with illumination sources.

What is claimed is:

1. An image display device comprising:
a memory capable of storing source data that are sources of a plurality of screen images;
a display capable of displaying at least one screen image selected from among the plurality of screen images;
an illumination source disposed around the display and capable of emitting light of a specified emission color; and
a controller that controls display on the display and light emission of the illumination source,
wherein the controller:
produces a current screen image data from the source data,
produces a current screen image based on the current screen image data to display the current screen image on the display,
produces a selective screen image data for producing a selective screen image which is different from the current screen image, from the source data,
produces an illumination data including an information about the emission color of the illumination source, the information about the emission color is determined based on the selective screen image data, and
controls the illumination source to emit light of an emission color determined based on the illumination data.

2. The image display device according to claim 1, further comprising an operation unit capable of accepting an input by a user,
wherein the controller, based on the input accepted by the operation unit,
produces the selective screen image from the selective screen image data,
controls the display to display the selective screen image on the display as a new current screen image, and
produces the illumination data from another selective screen image data for displaying another selective screen image which is different from the new current screen image and corresponds to the input acceptable by the operation unit.

3. The image display device according to claim 2, wherein the operation unit is capable of accepting the input regarding a direction, wherein the illumination source is made to correspond to the direction, and wherein the controller makes the direction and the selective screen image data correspond to each other, and controls the illumination source corresponding to the direction to emit light of a determined emission color.

4. The image display device according to claim 3, wherein the controller controls the display to display the selective screen image corresponding to the direction accepted by the operation unit with respect to the current screen image.

5. The image display device according to claim 3, wherein, in a case where there are no the source data for producing the selective screen image data corresponding to the direction accepted by the operation unit, the controller controls the illumination source corresponding to the accepted direction not to emit light.

6. An image display device comprising:
a memory capable of storing source data that are sources of a plurality of screen images and emission colors corresponding to the plurality of screen images;
a display capable of displaying at least one screen image selected from among the plurality of screen images;
an illumination source disposed around the display and capable of emitting light of a specified one of the emission colors; and
a controller that controls display on the display and light emission of the illumination source,
wherein the controller:
produces a current screen image data from the source data,
produces a current screen image based on the current screen image data to display the current screen image on the display, and
controls the illumination source to emit light of one of the emission colors corresponding to a selective screen image which is different from the current screen image.

7. The image display device according to claim 6, further comprising an operation unit capable of accepting an input by a user,
wherein the controller controls, based on the input accepted by the operation unit,
the display to display the selective screen image as a new current screen image, and
the illumination source to emit light of an emission color corresponding to another selective screen image which is different from the new current screen image and corresponds to the input acceptable by the operation unit.

8. The image display device according to claim 7, wherein the operation unit is capable of accepting the input regarding a direction,
wherein the illumination source is made to correspond to the direction, and
wherein the controller makes the direction and the selective screen image data correspond to each other, and controls the illumination source corresponding to the direction to emit light of one of the emission colors corresponding to the selective screen image.

9. The image display device according to claim 8, wherein the controller controls the display to display the selective screen image corresponding to the direction accepted by the operation unit with respect to the current screen image.

10. The image display device according to claim 8, wherein, in a case where there are no the source data for producing the selective screen image data corresponding to the direction accepted by the operation unit, the controller controls the illumination source corresponding to the accepted direction not to emit light.

11. An image display method for displaying an image on a display with an illumination source disposed around the display, the image display method comprising:
producing a current screen image data from source data which are sources of a plurality of screen images;
producing a current screen image based on the current screen image data to display the current screen image on the display;
producing a selective screen image data for producing a selective screen image which is different from the current screen image, from the source data;
producing an illumination data including an information about an emission color of the illumination source, the information about the emission color is determined based on the selective screen image data; and
controlling the illumination source to emit light of an emission color determined based on the illumination data.

12. The image display method according to claim 11, further comprising:
accepting an input by a user;
producing the selective screen image from the selective screen image data based on the input;
displaying the selective screen image on the display as a new current screen image; and
producing the illumination data from another selective screen image data for displaying another selective screen image which is different from the new current screen image and can be displayed based on the input.

13. The image display method according to claim 12, wherein the input is the input regarding a direction,
wherein the illumination source is made to correspond to the direction,
wherein the selective screen image data is made to correspond to the direction so that the emission color determined based on the illumination data corresponds to the direction, and
wherein the illumination source corresponding to the direction emits light of the emission color corresponding to the direction.

* * * * *